United States Patent
Saito et al.

(10) Patent No.: US 12,525,782 B2
(45) Date of Patent: Jan. 13, 2026

(54) MOTOR DRIVE DEVICE PROVIDED WITH CHARGING CONTROL UNIT

(71) Applicant: Fanuc Corporation, Yamanashi (JP)

(72) Inventors: Sou Saito, Yamanashi (JP); Tsutomu Shikagawa, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 212 days.

(21) Appl. No.: 18/285,405

(22) PCT Filed: Apr. 16, 2021

(86) PCT No.: PCT/JP2021/015772
§ 371 (c)(1),
(2) Date: Oct. 3, 2023

(87) PCT Pub. No.: WO2022/219823
PCT Pub. Date: Oct. 20, 2022

(65) Prior Publication Data
US 2024/0178646 A1    May 30, 2024

(51) Int. Cl.
*H02H 1/00* (2006.01)
*H02H 7/08* (2006.01)
(Continued)

(52) U.S. Cl.
CPC ........ *H02H 1/0007* (2013.01); *H02H 7/0822* (2013.01); *H02H 7/1222* (2013.01);
(Continued)

(58) Field of Classification Search
CPC .. H02H 1/0007; H02H 7/0822; H02H 7/1222; H02M 7/003; H02P 1/022; H02P 2201/03; H02P 29/024
See application file for complete search history.

(56) References Cited

U.S. PATENT DOCUMENTS 5,804,973 A    9/1998  Shinohara et al.
9,444,373 B2   9/2016  Yamamoto
(Continued)

FOREIGN PATENT DOCUMENTS

JP    62250876 A    10/1987
JP    0919003 A    1/1997
(Continued)

OTHER PUBLICATIONS

International Search Report and Written Opinion for International Application No. PCT/JP2021/015772, dated Jun. 22, 2021, 7 pages.

*Primary Examiner* — Danny Nguyen
*Assistant Examiner* — Nicolas Bellido
(74) *Attorney, Agent, or Firm* — BUCHANAN INGERSOLL & ROONEY PC

(57) ABSTRACT

A motor drive device includes: a converter that converts AC power supplied from an AC power source into DC power and outputs the DC power to a DC link; a capacitor installed in the DC link; an inverter that converts the DC power at the DC link into AC power for driving a motor and outputs the AC power; a charging circuit that has a charging resistor for preventing inrush current during the period of pre-charging of the capacitor; a charging control unit that controls the pre-charging of the capacitor executed by the charging circuit; and an abnormality determination unit that determines, during the period of pre-charging of the capacitor, whether an abnormality has occurred, on the basis of a measurement value of the voltage of the capacitor and/or a measurement value of the current flowing through the DC link.

9 Claims, 7 Drawing Sheets

(51) Int. Cl.
  *H02H 7/122* (2006.01)
  *H02M 7/00* (2006.01)
  *H02P 1/02* (2006.01)

(52) U.S. Cl.
  CPC ............ *H02M 7/003* (2013.01); *H02P 1/022* (2013.01); *H02P 2201/03* (2013.01)

(56) References Cited

U.S. PATENT DOCUMENTS

| | | | |
|---|---|---|---|
| 9,787,084 B2 | 10/2017 | Yoshida | |
| 2015/0323584 A1* | 11/2015 | Kuroki | G01R 31/68 318/490 |
| 2015/0365019 A1* | 12/2015 | Yamamoto | H02H 7/16 318/490 |
| 2016/0365820 A1* | 12/2016 | Kumamoto | H02P 27/08 |
| 2016/0380571 A1* | 12/2016 | Yoshida | H02H 7/1216 318/504 |
| 2018/0316275 A1* | 11/2018 | Yoshida | H02M 7/125 |
| 2020/0052489 A1* | 2/2020 | Shinoda | H02J 1/16 |
| 2020/0343836 A1* | 10/2020 | Shinoda | H02J 7/34 |

FOREIGN PATENT DOCUMENTS

| | | | | |
|---|---|---|---|---|
| JP | 2010252536 A | 11/2010 | | |
| JP | 2016005317 A | 1/2016 | | |
| JP | 2016129460 A | 7/2016 | | |
| JP | 2017017805 A | 1/2017 | | |
| JP | 2017163714 A | 9/2017 | | |
| WO | WO-2022044927 A1 * | 3/2022 | ......... | H02M 5/4585 |
| WO | WO-2025057294 A1 * | 3/2025 | ............. | H02P 27/06 |

* cited by examiner

MOTOR DRIVE DEVICE PROVIDED WITH CHARGING CONTROL UNIT

CROSS REFERENCE TO RELATED APPLICATIONS

This is the U.S. National Phase application of PCT/JP2021/015772, filed Apr. 16, 2021, the disclosure of this application being incorporated herein by reference in its entirety for all purposes.

FIELD OF THE INVENTION

The present invention relates to a motor drive device provided with a charging control unit.

BACKGROUND OF THE INVENTION

In a motor drive device for controlling the driving of a motor in a machine tool, a forging machine, an injection molding machine, an industrial machine, or a variety of robots, AC power supplied from an AC power source is converted into DC power by a converter (rectifier) and the DC power is output to a DC link, and the DC power in the DC link is further converted into AC power by an inverter and the AC power is supplied to a motor as motor driving power. The "DC link" refers to a circuit portion that electrically connects the DC output side of the converter and the DC input side of the inverter, and may also be referred to as a "DC link section", a "DC link part", a "DC link part", a "DC bus line", a "DC wiring", a "DC intermediate circuit" or the like.

The DC link is provided with a capacitor having a function of storing energy and a function of suppressing pulsation of the output on the DC side of the converter. The capacitor provided at the DC link is also referred to as a smoothing capacitor or a DC link capacitor, but is hereinafter simply referred to as a "capacitor".

The capacitor provided at the DC link needs to be charged to a voltage of a predetermined magnitude after the power source is applied to the motor drive device and before the start of the operation of the motor (i.e., before the start of a power conversion operation by the inverter). This charging is generally referred to as pre-charging or initial charging. Immediately after the pre-charging is started in a state where no energy is stored in the capacitor, a great inrush current is output from the converter to the DC link. The greater the capacitance of the capacitor is, the greater the inrush current is generated. For this reason, a pre-charging circuit (initial charging circuit) for preventing the inrush current is generally provided at the DC link which is the DC output side of the converter or at the AC input side of the converter. Hereinafter, the pre-charging circuit (initial charging circuit) is simply referred to as a "charging circuit".

For example, there is known a deterioration determination device for a capacitor in a motor-driven vehicle, wherein the motor-driven vehicle includes a battery (3), an inverter (6) that converts DC power output from the battery (3) into AC power, a traction motor (1) driven by the AC power output from the inverter (6), and a capacitor (27) connected in parallel with the inverter (6), and the deterioration determination device includes a charging means (41) that charges the capacitor (27), a voltage detecting means (S2) that detects a voltage of the capacitor (27), and a deterioration determining means (10) that determines the deterioration of the capacitor (27) based on a change state of the voltage of the capacitor (27) detected by the voltage detecting means (S2) while the charging means (41) is in operation (see, e.g., PTL 1).

For example, there is known an inverter device including a converter unit that converts an alternating current into a direct current, a DC capacitor that smooths an output of the converter unit, an inverter unit that converts a DC voltage across the DC capacitor into an AC voltage to drive an AC motor, a controller that supplies ON/OFF pulses to switching elements constituting the inverter unit, and a short-circuit bar provided at a DC wiring between the DC capacitor and the inverter unit, wherein the short-circuit bar is removed and replaced with a resistor when the device is subjected to off-line failure diagnosis (see, e.g., PTL 2).

For example, there is known a motor drive device including a rectifier that converts AC power supplied from an AC power source side and outputs DC power, a DC link capacitor provided at a DC link which is the DC output side of the rectifier, an inverter that converts the DC power in the DC link and outputs AC power for driving a motor, an initial charging circuit that is provided at the DC link and that charges the DC link capacitor with the DC power output from the rectifier, a potential difference determiner that determines whether or not a potential difference across the initial charging circuit has occurred, a DC current detecting unit that detects a DC current supplied from the rectifier to the initial charging circuit, an AC current detecting unit that detects an AC current supplied from the inverter to the motor, and an abnormality determination unit that determines that abnormal heat has been generated in the initial charging circuit when the potential difference determiner determines that a potential difference across the initial charging circuit has occurred and when the DC current detecting unit detects generation of a DC current and the AC current detecting unit detects generation of an AC current (see, e.g., PTL 3).

PATENT LITERATURE

[PTL 1] JP 09-019003 A
[PTL 2] JP 2010-252536 A
[PTL 3] JP 2017-017805 A

SUMMARY OF THE INVENTION

In a motor drive device in which a capacitor is provided at a DC link between a converter and an inverter, pre-charging is started after application of power source, and the pre-charging is completed when the capacitor reaches a predetermined charging voltage (e.g., DC 250 V) within a predetermined time period (e.g., within one second). Conventionally, when the capacitor does not reach the predetermined charging voltage within the predetermined time period after the start of the pre-charging, there is a possibility that an abnormality has occurred in the motor drive device, and thus the motor drive device outputs an alarm. In the case where a plurality of motor drive devices use the same power source (power switchboard), if the power supplied to one motor drive device decreases, the pre-charging is not completed within the predetermined time period and an alarm is output. Unless an abnormality has occurred in the motor drive device, the pre-charging can be completed with more time. Thus, it is not economical to issue an alarm without exception when the pre-charging is not completed within the predetermined time period. On the other hand, it is necessary to avoid continuation of the pre-charging when there is an abnormality in the motor drive device. Therefore, for a motor drive device including a capacitor provided at a DC link between a converter and an inverter and a charging circuit for the capacitor, there is a need for a technique of completing the pre-charging of the capacitor efficiently and safely.

According to one aspect of the present disclosure, a motor drive device includes a converter that converts AC power supplied from an AC power source into DC power and outputs the DC power to a DC link, a capacitor provided at the DC link, an inverter that converts the DC power in the DC link into AC power for driving a motor and outputs the AC power, a charging circuit including a charging resistor for preventing an inrush current during a time period of pre-charging of the capacitor, a charging control unit that controls the pre-charging of the capacitor by the charging circuit, and an abnormality determination unit that determines whether or not an abnormality has occurred based on at least one of a measurement value of a voltage of the capacitor or a measurement value of a current flowing through the DC link during the time period of the pre-charging of the capacitor.

According to another aspect of the present disclosure, a motor drive device includes a converter that converts AC power supplied from an AC power source into DC power and outputs the DC power to a DC link, a capacitor provided at the DC link, an inverter that converts the DC power in the DC link into AC power for driving a motor and outputs the AC power, a charging circuit including a charging resistor for preventing an inrush current during a time period of pre-charging of the capacitor, a charging control unit that controls the pre-charging of the capacitor by the charging circuit, a power consumption status acquisition unit that acquires a parameter related to a power consumption status of an electric machine system supplied with the AC power from the AC power source, and an abnormality determination unit that determines whether or not an abnormality has occurred based on a measurement value of a voltage of the capacitor, a measurement value of a current flowing through the DC link, and the parameter during the time period of the pre-charging of the capacitor.

According to still another aspect of the present disclosure, a motor drive device includes a converter that converts AC power supplied from an AC power source into DC power and outputs the DC power to a DC link, a capacitor provided at the DC link, an inverter that converts the DC power in the DC link into AC power for driving a motor and outputs the AC power, a charging circuit including a charging resistor for preventing an inrush current during a time period of pre-charging of the capacitor, a charging control unit that controls the pre-charging of the capacitor by the charging circuit, a power consumption status acquisition unit that acquires a parameter related to a power consumption status of an electric machine system supplied with the AC power from the AC power source, and an abnormality determination unit that determines whether or not an abnormality has occurred based on the parameter during the time period of the pre-charging of the capacitor.

According to an aspect of the present disclosure, in a motor drive device including a capacitor provided at a DC link between a converter and an inverter and a charging circuit for the capacitor, pre-charging of the capacitor can be completed efficiently and safely.

DETAILED DESCRIPTION OF EMBODIMENTS OF THE INVENTION

Figure 1:
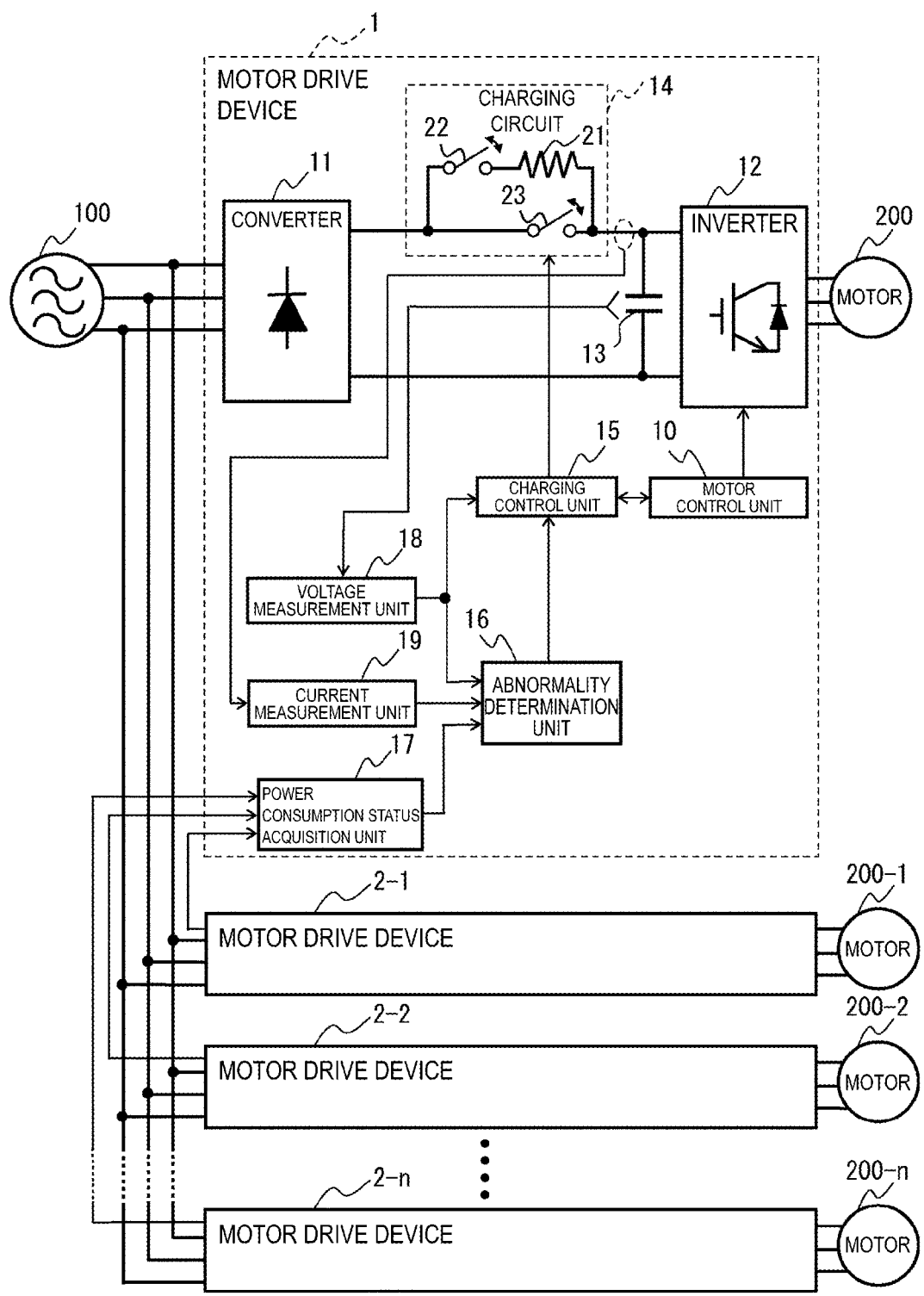
FIG. 1 is a diagram illustrating a motor drive device according to an embodiment of the present disclosure.

Hereinafter, a motor drive device with a charging control unit will be described with reference to drawings. The drawings are appropriately scaled for ease of understanding. The embodiments illustrated in the drawings are examples for implementation, and the present disclosure is not limited to the embodiments illustrated.

FIG. 1 is a diagram illustrating a motor drive device according to an embodiment of the present disclosure.

As an example, a case where a motor 200 is controlled by a motor drive device 1 connected to an AC power source 100 will be described. In the present embodiment, the type of motor 200 is not particularly limited, and may be, for example, an induction motor or a synchronous motor, and the number of the motors 200 is also not particularly limited. In addition, the number of phases of the AC power source 100 and the motor 200 does not particularly limit the present embodiment, and may be, for example, three phases or a single phase. In the example illustrated in FIG. 1, each of the AC power source 100 and the motor 200 has three phases. Examples of the AC power source 100 include a three-phase AC 400 V power source, a three-phase AC 200 V power source, a three-phase AC 600 V power source, and a single-phase AC 100 V power source. Examples of a machine at which the motor 200 is provided include a machine tool, a robot, a forging machine, an injection molding machine, an industrial machine, and the like.

In addition to the motor drive device 1, at least one electric machine system is connected to the AC power source 100. In the example illustrated in FIG. 1, for example, n motor drive devices 2-1 to 2-$n$ (where n is a positive integer) are connected to the AC power source 100 as electric machine systems, but the electric machine system connected to the AC power source 100 is not limited to the motor drive devices 2-1 to 2-$n$ and may be any machine supplied with AC power from the AC power source 100. The motor drive device 1 and the motor drive devices 2-1 to 2-$n$ are supplied with AC power from the same AC power source 100. For example, the motor drive devices 2-1 to 2-$n$ drive motors 200-1 to 200-$n$, respectively, but each of the motor drive devices 2-1 to 2-$n$ may drive a plurality of motors 200.

The motor drive device 1 according to an embodiment of the present disclosure includes a converter 11, an inverter 12, a capacitor 13, a charging circuit 14, a charging control unit 15, an abnormality determination unit 16, a power consumption status acquisition unit 17, a voltage measurement unit 18, and a current measurement unit 19.

The converter 11 converts AC power supplied from the AC power source 100 into DC power and outputs the DC power to a DC link which is a DC output side. The converter 11 is composed of a three-phase bridge circuit in the case where three-phase AC power is supplied from the AC power source 100, and is composed of a single-phase bridge circuit in the case where single-phase AC power is supplied from the AC power source 100. In the illustrated example, since the AC power source 100 is a three-phase AC power source, the converter 11 is composed of a three-phase bridge circuit. Examples of the converter 11 include a diode rectifier, a 120-degree conduction rectifier, and a PWM-controlled rectifier. For example, in the case where the converter 11 is a 120-degree conduction rectifier or a PWM-controlled rectifier, the converter 11 includes a bridge circuit composed of switching elements and diodes connected in anti-parallel to the switching elements. Each of the switching elements is on-off controlled in response to a drive command received from a higher-level control device (not illustrated) to perform both AC-to-DC and DC-to-AC power conversions. In this case, examples of the switching element include an FET, an IGBT, a thyristor, a GTO, a transistor, and the like, but other semiconductor elements may be used.

The inverter 12 is connected to the converter 11 via the DC link. The inverter 12 converts the DC power in the DC link into AC power for driving the motor 200 and outputs the AC power. More specifically, the ON-OFF operations of switching elements inside the inverter 12 are PWM-controlled in response to switching commands generated by a motor control unit 10, whereby the inverter 12 converts the DC power in the DC link into AC power and supplies the AC power to the motor 200 on the AC side and converts AC power regenerated by deceleration of the motor 200 into DC power and returns the DC power to the DC link. The inverter 12 includes a full-bridge circuit including switching elements and diodes connected in anti-parallel to the switching elements. Examples of the switching element include an IGBT, an FET, a thyristor, a GTO, and a transistor, but other semiconductor elements may be used. In the example illustrated in FIG. 1, since the motor 200 is a three-phase AC motor, the inverter 12 is composed of a three-phase full-bridge circuit. When the motor 200 is a single-phase AC motor, the inverter 12 is composed of a single-phase bridge circuit. When one motor drive device 1 drives a plurality of motors 200, the same number of inverters 12 as the number of the motors 200 may be provided at the motor drive device 1.

The motor control unit 10 controls the driving of the motor 200 by controlling the inverter 12 that performs power conversion between DC power in the DC link and the AC power which is driving power or regenerative power of the motor 200. That is, the motor control unit 10 in the motor drive device 1 generates a switching command for controlling a speed, a torque, or a rotor position of the motor 200 based on a rotation speed (speed feedback) of the motor 200 (a rotor), a current flowing through a winding of the motor 200 (current feedback), a predetermined torque command, an operation program of the motor 200, and the like. The power conversion operation by the inverter 12 is controlled based on the switching command generated by the motor control unit 10. A speed, a torque, or a rotor position of the motor 200 is controlled based on AC power supplied from the inverter 12.

The capacitor 13 is provided at the DC link which is the DC output side of the converter 11. The capacitor 13 has a function of suppressing the pulsation of DC output from the converter 11 and a function of storing DC power. Examples of the capacitor 13 include an electrolytic capacitor and a film capacitor.

The capacitor 13 provided at the DC link needs to be pre-charged to a voltage of a predetermined magnitude after application of the power source the motor drive device 1 and before the driving of the motor 200 is started (i.e., before the start of the power conversion operation by the inverter 12). Immediately after the start of pre-charging, a great inrush current flows from the converter 11 to the DC link. The charging circuit 14 has a function of preventing an inrush current during a time period of the pre-charging of the capacitor 13. In the example illustrated in FIG. 1, the charging circuit 14 is provided between the DC output side of the converter 11 and the capacitor 13.

The charging circuit 14 includes a charging resistor 21, a charging switch 22, and a main circuit switch 23. The charging control unit 15 controls the pre-charging of the capacitor 13 by the charging circuit 14 by controlling the open/close state of the charging switch 22 and the main circuit switch 23. The charging switch 22 is connected in series to the charging resistor 21 and opens and closes an electric path under the control of the charging control unit 15. The main circuit switch 23 is connected in parallel to a set of the charging resistor 21 and the charging switch 22 connected in series. The main circuit switch 23 opens and closes an electric path between the converter 11 and the capacitor 13 under the control of the charging control unit 15.

When the power source is applied to the motor drive device 1, the supply of power from the AC power source 100 to the motor drive device 1 is started and the pre-charging of the capacitor 13 is started. During the time period of the pre-charging from the application of the power source to the motor drive device 1 to the start of the driving of the motor 200, the charging switch 22 is controlled to be in a closed state and the main circuit switch 23 is controlled to be in an open state by the charging control unit 15. During the time period of the pre-charging, the charging switch 22 is kept in the closed state and the main circuit switch 23 is kept in the open state, and thus the current output from the converter 11 flows into the capacitor 13 as a charging current via the charging resistor 21, and the capacitor 13 is charged (pre-charged). In this way, during the time period of the pre-charging, since the current output from the converter 11 flows through the charging resistor 21, the generation of an inrush current can be prevented. When the capacitor 13 is charged to a predetermined charging voltage after the start of the pre-charging, the charging switch 22 is controlled to be in an open state and the main circuit switch 23 is controlled to be in a closed state by the charging control unit 15, and the pre-charging of the capacitor 13 is completed. After completion of the pre-charging, the driving of the motor 200 by the motor drive device 1 is started, and the current output from the converter 11 flows toward the capacitor 13 and the inverter 12 through the main circuit switch 23 in the closed state. Although details will be described below, when one end of the charging resistor 21 is disconnected from an electric path so as to determine whether or not an abnormality has occurred at the DC link, the charging control unit 15 controls the charging switch 22 and the main circuit switch 23 to be in the open state.

The voltage measurement unit 18 measures a voltage applied between a positive terminal and a negative terminal of the capacitor 13 (hereinafter simply referred to as a "voltage of the capacitor 13"). The voltage of the capacitor 13 is a DC link voltage that is an inter-terminal voltage of the DC link. That is, the voltage measurement unit 18 detects, as a DC link voltage, a value of a potential difference between a positive potential at a positive terminal on the DC output side of the converter 11 and a negative potential at a negative terminal on the DC output side of the converter 11. The measurement value of the voltage of the capacitor 13 acquired by the voltage measurement unit 18 is used for an abnormality determination process by the abnormality determination unit 16, a pre-charging process by the charging control unit 15, and a DC link voltage control.

The current measurement unit 19 measures a current flowing through the DC link. In the example illustrated in FIG. 1, the current measurement unit 10 measures a current flowing between a connection point of the capacitor 13 and the inverter 12 and the charging circuit 14. The measurement value of the current flowing through the DC link acquired by the current measurement unit 19 is used for the abnormality determination process by the abnormality determination unit 16.

The power consumption status acquisition unit 17 and each motor control unit in the motor drive devices 2-1 to 2-n, which are electric machine systems supplied with AC power from the AC power source 100, are communicably connected to each other via a communication line. The communication line may be a wired communication line such as various types of electric communication cables or optical fiber cables, or may be a wireless communication line such as WiFi or infrared rays. The power consumption status acquisition unit 17 acquires a parameter related to a power consumption status of the motor drive devices 2-1 to 2-n (hereinafter referred to as a "power consumption parameter") via the communication line.

Examples of the power consumption parameter acquired by the power consumption status acquisition unit 17 include the total amount of power (wattage) consumed by the motor drive devices 2-1 to 2-n, the number of the motors 200-1 to 200-n that are being accelerated by the motor drive devices 2-1 to 2-n, the number of capacitors that are provided at the DC links in the motor drive devices 2-1 to 2-n and are being pre-charged, and the sum of the number of the motors that are being accelerated and the number of the capacitors that are being pre-charged in the motor drive devices 2-1 to 2-n.

When the total amount of power consumed by the motor drive devices 2-1 to 2-n is used as a power consumption parameter, the motor control unit or a higher-level control device (not illustrated) at each of the motor drive devices 2-1 to 2-n is configured to calculate the amount of power consumed by the corresponding motor drive device. The power consumption status acquisition unit 17 acquires data about the amounts of power consumption of the motor drive devices 2-1 to 2-n via the communication line, calculates the sum of the acquired amounts of power consumption of the motor drive devices 2-1 to 2-n, and sets the sum as a power consumption parameter.

When the number of the motors 200-1 to 200-n that are being accelerated by the motor drive devices 2-1 to 2-n is used as a power consumption parameter, the motor control unit in each of the motor drive devices 2-1 to 2-n is configured to set an "acceleration flag", which is data indicating that the motor is being accelerated, while a motor drive part is accelerating the motor. That is, in each of the motor drive devices 2-1 to 2-n, the acceleration flag is set while the motor drive part is accelerating the motor, and the acceleration flag is not set while the motor drive part is not accelerating the motor (i.e., the motor is being decelerated or stopped). The power consumption status acquisition unit 17 calculates the number of the motors 200-1 to 200-n that are being accelerated by the motor drive devices 2-1 to 2-n based on the number of the acceleration flags acquired via the communication line, and sets the number as a power consumption parameter.

When the number of capacitors that are provided at the DC links in the motor drive devices 2-1 to 2-n and are being pre-charged is used as a power consumption parameter, a higher-level control device (not illustrated) in each of the motor drive devices 2-1 to 2-n is configured to set a "charging flag", which is data indicating that the capacitor is being pre-charged, while the capacitor is being pre-charged. That is, in each of the motor drive devices 2-1 to 2-n, the charging flag is set while the capacitor is being pre-charged, and the charging flag is not set while the capacitor is not being pre-charged. The power consumption status acquisition unit 17 calculates the number of capacitors that are provided at the DC links in the motor drive devices 2-1 to 2-n and are being pre-charged based on the number of the charging flags acquired via the communication line, and sets the number as a power consumption parameter.

When the sum of the number of the motors that are being accelerated and the number of the capacitors that are being pre-charged in the motor drive devices 2-1 to 2-n is used as a power consumption parameter, in each of the motor drive device 2-1 to 2-n, the motor control unit is configured to set the "acceleration flag", which is data indicating that the motor is being accelerated, while the motor drive part is accelerating the motor, and the higher-level control device (not illustrated) is configured to set the "charging flag", which is data indicating that the capacitor is being pre-charged, while the capacitor is being pre-charged. The power consumption status acquisition unit 17 calculates the sum of the number of the motors that are being accelerated and the number of the capacitors that are being pre-charged in the motor drive devices 2-1 to 2-n based on the numbers of the acceleration flags and the charging flags acquired via the communication line, and set the sum as a power consumption parameter. In calculating a power consumption parameter, weighting may be performed between the number of the motors that are being accelerated and the number of the capacitors that are being pre-charged in the motor drive devices 2-1 to 2-n.

The abnormality determination unit 16 determines whether or not an abnormality has occurred based on a measurement value of a voltage of the capacitor 13, a measurement value of a current flowing through the capacitor 13, and a power consumption parameter during the time period of the pre-charging of the capacitor 13. The determination result by the abnormality determination unit 16 is sent to the charging control unit 15. Details of the abnormality determination process by the abnormality determination unit 16 will be described below.

When the abnormality determination unit 16 determines that an abnormality has occurred, the pre-charging of the capacitor 13 is stopped. The pre-charging of the capacitor 13 is stopped by interrupting the flow of a current from the converter 11 to the capacitor 13. For example, the charging control unit 15 controls both the charging switch 22 and the main circuit switch 23 to be in the open state, or controls a switching device (not illustrated) such as a magnetic contactor provided between the converter 11 and the AC power source 100 to be in the open state, whereby the flow of the current from the converter 11 to the capacitor 13 can be interrupted.

An arithmetic processing device (processor) is provided at the motor drive device 1. Examples of the arithmetic processing device include an IC, an LSI, a CPU, an MPU, a DSP, and the like. The arithmetic processing device includes the charging control unit 15, the abnormality determination unit 16, the power consumption status acquisition unit 17, the voltage measurement unit 18, and the current measurement unit 19. Each of these units included in the arithmetic processing device is, for example, a functional module implemented by a computer program executed in the processor. For example, when the charging control unit 15, the abnormality determination unit 16, the power consumption status acquisition unit 17, the voltage measurement unit 18, and the current measurement unit 19 are constructed in a computer program format, the functions of the respective units can be implemented by causing the arithmetic processing device to operate in accordance with the computer program. The computer program for executing the processing of the charging control unit 15, the abnormality determination unit 16, the power consumption status acquisition unit 17, the voltage measurement unit 18, and the current measurement unit 19 may be provided in a form recorded in a computer-readable recording medium such as a semiconductor memory, a magnetic recording medium, or an optical recording medium. Alternatively, the charging control unit 15, the abnormality determination unit 16, the power consumption status acquisition unit 17, the voltage measurement unit 18, and the current measurement unit 19 may be implemented as a semiconductor integrated circuit in which a computer program for implementing the function of each unit is written.

Figure 2:
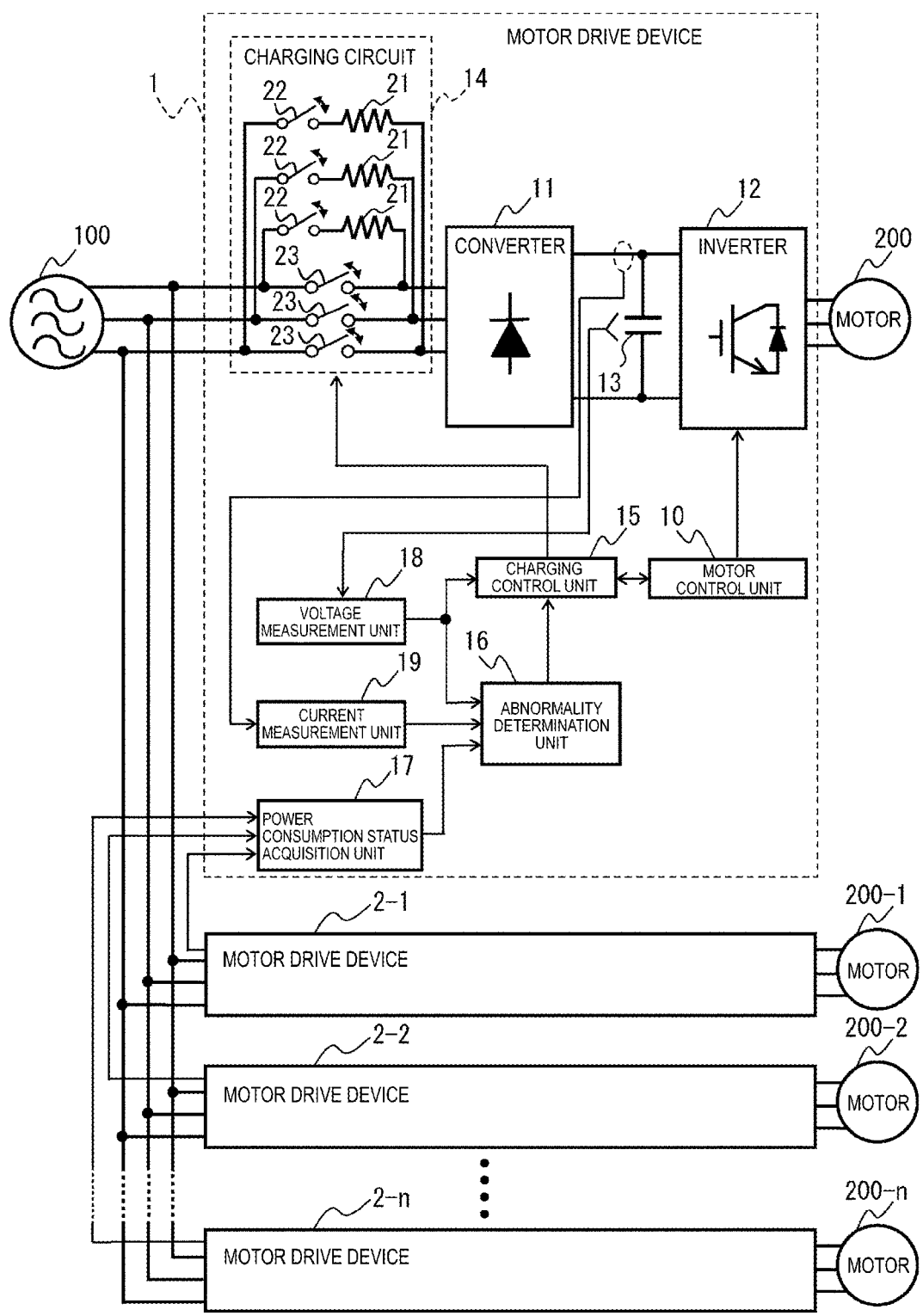
FIG. 2 is a diagram illustrating a case where a charging circuit is provided between an AC input side of a converter and an AC power source in the motor drive device according to an embodiment of the present disclosure.

Although the charging circuit 14 is provided between the DC output side of the converter 11 and the capacitor 13 in the example illustrated in FIG. 1, the charging circuit 14 may be provided between the AC input side of the converter 11 and the AC power source 100. FIG. 2 is a diagram illustrating a case where a charging circuit is provided between an AC input side of a converter and an AC power source in the motor drive device according to an embodiment of the present disclosure. As illustrated in FIG. 2, when the AC power source 100 is a three-phase AC power source, the main circuit switches 23 are provided on at least two out of three-phase power lines connecting the AC input side of the converter 11 and the three-phase AC power source 100. In the example illustrated in FIG. 2, for example, the main circuit switches 23 are provided on all the three-phase power lines connecting the AC input side of the converter 11 and the three-phase AC power source 100. Sets of the charging resistor 21 and the charging switch 22 connected in series are connected in parallel to the main circuit switches 23. When the AC power source 100 is a single-phase AC power source, the main circuit switch 23 is provided on at least one of the two power lines connecting the AC input side of the converter 11 and the single-phase AC power source 100, and a set of the charging resistor 21 and the charging switch 22 connected in series is connected in parallel to the main circuit switch 23. The current measurement unit 19 measures a current flowing between the connection point of the capacitor 13 and the inverter 12 and the converter 11 as the current flowing through the DC link.

Next, the abnormality determination process by the abnormality determination unit 16 will be described.

In the motor drive device 1 according to an embodiment of the present disclosure, the abnormality determination unit 16 determines whether or not an abnormality has occurred based on a measurement value of a voltage of the capacitor 13, a measurement value of a current flowing through the capacitor 13, and a power consumption parameter, during the time period of the pre-charging of the capacitor 13.

During the time period of the pre-charging of capacitor 13, when there is no abnormality in the motor drive device 1 and the power consumption by the motor drive devices 2-1 to 2-n does not affect the pre-charging of the motor drive device 1, the measurement value of the voltage of capacitor 13 increases at an increase rate having a certain magnitude. On the other hand, when there is an abnormality in the motor drive device 1 or the power consumption by the motor drive devices 2-1 to 2-n affects the pre-charging of the motor drive device 1, the increase rate of the measurement value of the voltage of capacitor 13 decreases during the time period of the pre-charging of capacitor 13. A first threshold value $Th_A$ for distinguishing the magnitude of the increase rate is set in advance. When the increase rate of the measurement value of the voltage of the capacitor 13 is equal to or more than the first threshold value $Th_A$, the abnormality determination unit 16 determines that no abnormality has occurred.

When a great current flows through the DC link even though the measurement value of the voltage of the capacitor 13 is lower than the first threshold value $Th_A$ (i.e., the increase rate of the measurement value of the voltage of the capacitor 13 is low) during the time period of the pre-charging of the capacitor 13, there is a possibility that an abnormality such as a resistance short-circuit due to a foreign substance has occurred at the DC link in the motor drive device 1. It is possible to determine whether or not an abnormality such as a resistance short-circuit has occurred at the DC link by checking a decrease tendency of the DC link voltage in a state where one end of the charging resistor 21 is disconnected from the electric path in the charging circuit 14. A second threshold value $Th_B$ for distinguishing the magnitude of a current flowing through the DC link and a third threshold value $Th_C$ for determining whether or not an abnormality such as a resistance short-circuit has occurred at the DC link are set in advance. When the increase rate of the measurement value of the voltage of the capacitor 13 is lower than the first threshold value $Th_A$ and the measurement value of the current flowing through the DC link is equal to or more than the second threshold value $Th_B$, one end of the charging resistor 21 is disconnected from the electric path in the charging circuit 14. In this state, the abnormality determination unit 16 determines that an abnormality has occurred at the DC link when a decrease rate of the measurement value of the voltage of the capacitor 13 is equal to or more than the third threshold value $Th_C$, and determines that no abnormality has occurred at the DC link when the decrease rate of the measurement value of the voltage of the capacitor 13 is lower than the third threshold value $Th_C$.

When the measurement value of the voltage of the capacitor 13 is lower than the first threshold value $Th_A$ (i.e., the increase rate of the measurement value of the voltage of the capacitor 13 is low) and the measurement value of the current flowing through the DC link is lower than the second threshold value $Th_B$ (i.e., the current flowing through the DC link is low) during the time period of the pre-charging of the capacitor 13, there is a possibility that the power consumption by the motor drive devices 2-1 to 2-n has affected the pre-charging of the motor drive device 1 or an abnormality has occurred in the charging circuit 14. Examples of the abnormality of the charging circuit 14 include a failure of the charging switch 22, a failure of the main circuit switch 23, and a resistance short-circuit due to a foreign substance in the charging circuit 14. It is possible to determine whether or not the power consumption by the motor drive devices 2-1 to 2-n has affected the pre-charging of the motor drive device 1 by checking a power consumption parameter that indicates the power consumption status of the motor drive devices 2-1 to 2-n. A fifth threshold value $Th_E$ for distinguishing between a possibility that the power consumption by the motor drive devices 2-1 to 2-n has affected the pre-charging of the motor drive device 1 and a possibility that an abnormality has occurred in the charging circuit 14 is set in advance. When the power consumption parameter is equal to or more than the fifth threshold value $Th_E$, the abnormality determination unit 16 determines that the power consumption by the motor drive devices 2-1 to 2-n has affected the pre-charging of the motor drive device 1. When there is no abnormality in the charging circuit 14 and only the power consumption by the motor drive devices 2-1 to 2-n has affected the pre-charging of the motor drive device 1, there is no particular problem if the pre-charging operation is continued. On the other hand, when the power consumption parameter is lower than the fifth threshold value $Th_E$, the power consumption by the motor drive devices 2-1 to 2-n has not affected the pre-charging of the motor drive device 1, and thus the abnormality determination unit 16 determines that an abnormality has occurred in the charging circuit 14.

The pre-charging of the capacitor 13 is continued unless the abnormality determination unit 16 determines an abnormality has occurred, and the pre-charging of the capacitor 13 is stopped when the abnormality determination unit 16 determines that an abnormality has occurred. Accordingly, the pre-charging of the capacitor 13 can be completed efficiently and safely.

Note that the first threshold value $Th_A$, the second threshold value $Th_B$, the third threshold value $Th_C$, the fourth threshold value $Th_B$, and the fifth threshold value $Th_E$ are selected in advance before the normal operation of the motor drive device 1. For example, a system including a motor drive device 1 confirmed to have no abnormality and motor drive devices 2-1 to 2-n that share an AC power source 100 with the motor drive device 1, and a system including a motor drive device 1 in which an abnormality of the DC link or the charging circuit 14 is simulatively reproduced and motor drive devices 2-1 to 2-n that share an AC power source 100 with the motor drive device 1 are constructed as actual systems or computer-simulated systems. Then, the pre-charging operations are reproduced by operating the actual systems or by operating the computer-simulated systems, and measurement values of voltages of the capacitors 13 and measurement values of currents flowing through the DC links are acquired. In consideration of the respective measurement values acquired, the operation environments of the motor drive devices 1, and the like, the first threshold value $Th_A$, the second threshold value $Th_B$, the third threshold value $Th_C$, the fourth threshold value $Th_B$, and the fifth threshold value $Th_E$ are selected so as to distinguish between a possibility that an abnormality has occurred and a possibility that the power consumption by the motor drive devices 2-1 to 2-n has affected the pre-charging of the motor drive devices 1. When the total amount of power (wattage) consumed by the motor drive devices 2-1 to 2-n is used as a power consumption parameter, the amount of power is set as the fifth threshold value $Th_E$. When the number of motors 200-1 to 200-n that are being accelerated by the motor drive devices 2-1 to 2-n is used as a power consumption parameter, the number of motors is set as the fifth threshold value Th E. When the number of capacitors that are provided at the DC links in the motor drive devices 2-1 to 2-n and are being pre-charged is used as a power consumption parameter, the number of capacitors is set as the fifth threshold value $Th_E$. When the sum of the number of motors that are being accelerated and the number of capacitors that are being pre-charged in the motor drive devices 2-1 to 2-n is used as a power consumption parameter, the number of the capacitors and the number of the motors are set as the fifth threshold value $Th_E$.

The first threshold value $Th_A$, the second threshold value $Th_B$, the third threshold value $Th_C$, the fourth threshold value $Th_B$, and the fifth threshold value $Th_E$ selected as above are stored in a storage (not illustrated) in the abnormality determination unit 16 or a storage (not illustrated) connected to the abnormality determination unit 16. The storage may be composed of a non-volatile memory, such as EEPROM (registered trademark), which is electrically erasable and recordable, or a random access memory, such as DRAM and SRAM, which is readable and writable at high speed, for example. In addition, when the storage is implemented by a rewritable storage device, even after the first threshold value $Th_A$, the second threshold value $Th_B$, the third threshold value $Th_C$, the fourth threshold value $Th_B$, and/or the fifth threshold value $Th_E$ are once set, these threshold values can be changed to appropriate values as necessary. For example, the first threshold value $Th_A$, the second threshold value $Th_B$, the third threshold value $Th_C$, and/or the fourth threshold value $Th_B$ stored in the storage may be rewritten in accordance with a change in capacitance due to deterioration of the capacitor 13. Further, for example, the number, the operation program, or the mechanical configuration of electric machine systems (e.g., the motor drive devices 2-1 to 2-n) that share the AC power source 100 with the motor drive device 1 may be changed. In accordance with such a change in the electric machine systems, the fifth threshold $Th_E$ stored in the storage may be rewritten.

Figure 3:
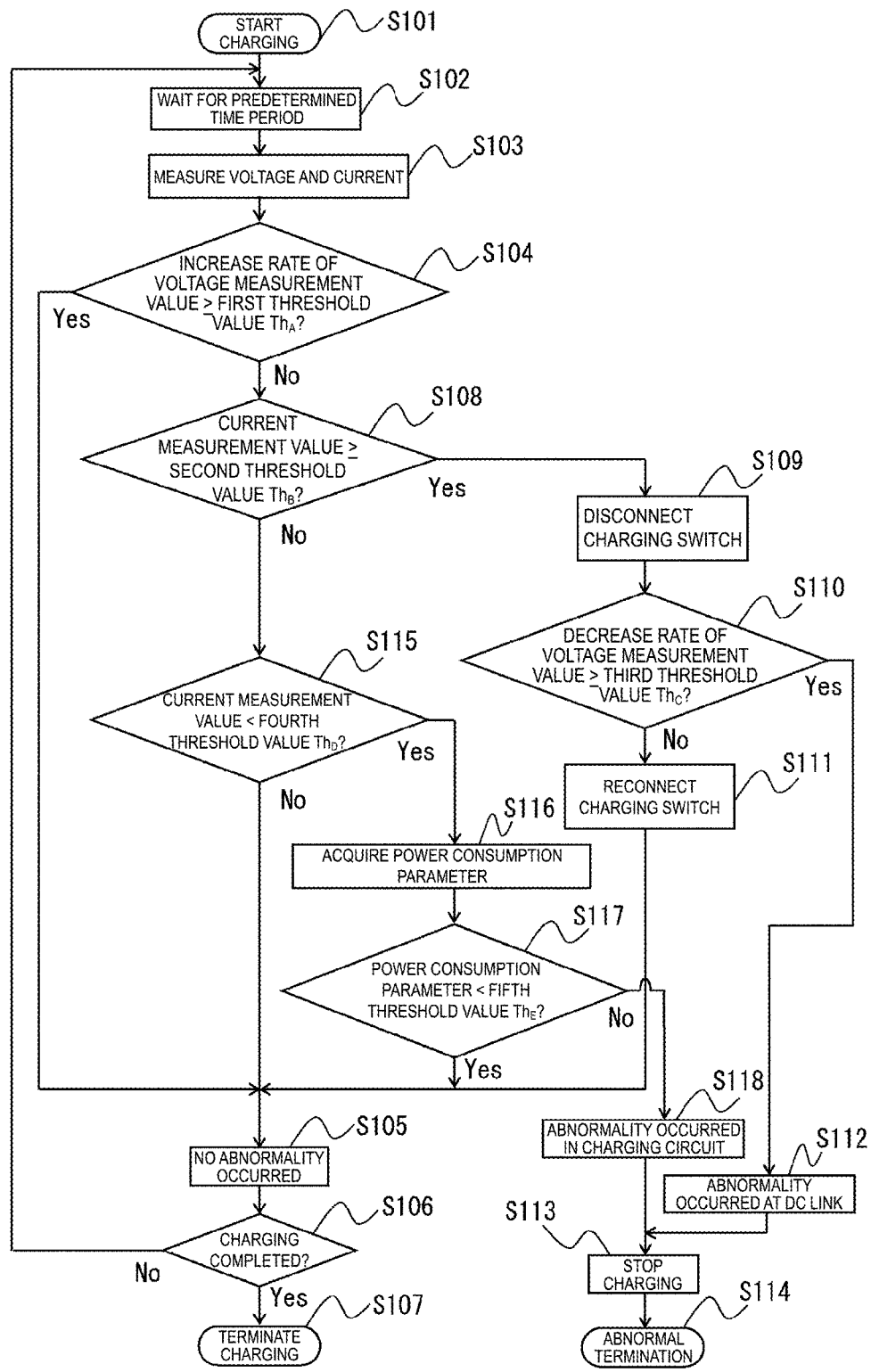
FIG. 3 is a flowchart illustrating a pre-charging operation in the motor drive device according to an embodiment of the present disclosure.

FIG. 3 is a flowchart illustrating a pre-charging operation in the motor drive device according to an embodiment of the present disclosure.

In step S101, in a state where the charging control unit 15 controls the charging switch 22 to be in the closed state and controls the main circuit switch 23 to be in the open state, the supply of power from the AC power source 100 to the motor drive device 1 is started when the AC power source 100 is applied to the motor drive device 1, and the pre-charging of the capacitor 13 is started.

After waiting for a predetermined time period in step S102, in step S103, the voltage measurement unit 18 measures a voltage of the capacitor 13 and the current measurement unit 19 measures a current flowing through the DC link. The measurement value of the voltage is sent to the abnormality determination unit 16 and the charging control unit 15, and the measurement value of the current is sent to the abnormality determination unit 16.

In step S104, the abnormality determination unit 16 determines whether or not the increase rate of the measurement value of the voltage of the capacitor 13 is equal to or more than the first threshold value $Th_A$.

When it is determined in step S104 that the increase rate of the measurement value of the voltage of the capacitor 13 is equal to or more than the first threshold value $Th_A$, the processing proceeds to step S105. When it is determined in step S104 that the increase rate of the measurement value of the voltage of the capacitor 13 is lower than the first threshold value $Th_A$, the processing proceeds to step S108.

In step S105, the abnormality determination unit 16 determines that no abnormality has occurred.

In step S106 subsequent to step S105, the charging control unit 15 determines whether or not the pre-charging of the capacitor 13 has been completed based on whether or not the measurement value of the voltage sent from the voltage measurement unit 18 has reached a predetermined charging voltage. When the measurement value of the voltage sent from the voltage measurement unit 18 has not reached the predetermined charging voltage, the charging control unit 15 determines in step S106 that the pre-charging of the capacitor 13 has not been completed, and then the processing returns to step S102. On the other hand, when the measurement value of the voltage sent from the voltage measurement unit 18 has reached the predetermined charging voltage, the charging control unit 15 determines in step S106 that the pre-charging of the capacitor 13 has been completed, and the processing proceeds to step S107.

In step S107, the charging control unit 15 controls the charging switch 22 to be in the open state and controls the main circuit switch 23 to be in the closed state, thereby terminating the pre-charging of the capacitor. After the pre-charging is completed, the motor drive device 1 drives the motor 200 by causing the converter 11 and the inverter 12 to perform normal power conversion operations.

When it is determined in step S104 that the increase rate of the measurement value of the voltage of the capacitor 13 is lower than the first threshold value $Th_A$, the abnormality determination unit 16 determines in step S108 whether or not the measurement value of the current flowing through the DC link is equal to or more than the second threshold value $Th_B$. When it is determined in step S108 that the measurement value of the current flowing through the DC link is equal to or more than the second reference value $Th_B$, the processing proceeds to step S109, and when it is determined in step S108 that the measurement value of the current flowing through the DC link is lower than the second reference value $Th_B$, the processing proceeds to step S115.

When it is determined in step S108 that the measurement value of the current flowing through the DC link is equal to or more than the second threshold value $Th_B$, in step S109, the charging control unit 15 performs a disconnection operation using the charging switch 22. That is, the charging control unit 15 performs a control of switching the charging switch 22 from the closed state to the open state, thereby disconnecting one end of the charging resistor 21 from an electric path in the charging circuit 14.

In step S110, the abnormality determination unit 16 determines whether or not the decrease rate of the measurement value of the voltage of the capacitor 13 is equal to or more than the third threshold value $Th_C$.

When it is determined in step S110 that the decrease rate of the measurement value of the voltage of the capacitor 13 is equal to or more than the third threshold value $Th_C$, the processing proceeds to step S112, and the abnormality determination unit 16 determines that an abnormality has occurred at the DC link, and then the processing proceeds to step S113.

When it is determined in step S110 that the decrease rate of the measurement value of the voltage of the capacitor 13 is lower than the third threshold value $Th_C$, the processing proceeds to step S111. In step S111, the charging control unit 15 performs a reconnection operation using the charging switch 22. That is, the charging control unit 15 performs a control of switching the charging switch 22 from the open state to the closed state, thereby reconnecting the charging resistor 21 on the electric path in the charging circuit 14. Then, the processing proceeds to step S105.

When it is determined in step S108 that the measurement value of the current flowing through the DC link is lower than the second threshold value $Th_B$, the abnormality determination unit 16 determines in step S115 whether or not the measurement value of the current flowing through the DC link is lower than the fourth threshold value $Th_D$. When it is determined in step S115 that the measurement value of the current flowing through the DC link is lower than the fourth threshold value $Th_D$, the processing proceeds to step S116, and when it is determined in step S115 that the measurement value of the current flowing through the DC link is equal to or more than the fourth threshold value $Th_D$, the processing proceeds to step S105.

In step S116, the power consumption status acquisition unit 17 acquires a power consumption parameter indicating the power consumption status of the motor drive devices 2-1 to 2-$n$ via the communication line.

In step S117, the abnormality determination unit 16 determines whether or not the power consumption parameter is lower than the fifth threshold value $Th_E$. When it is determined in step S117 that the power consumption parameter is lower than the fifth threshold value $Th_E$, the processing proceeds to step S105, and when it is determined in step S117 that the power consumption parameter is equal to or more than the fifth threshold value $Th_E$, the processing proceeds to step S118.

When it is determined in step S117 that the power consumption parameter is equal to or more than the fifth threshold value $Th_E$, the abnormality determination unit 16 determines in step S118 that an abnormality has occurred at the charging circuit 14, and then the processing proceeds to step S113.

When the abnormality determination unit 16 determines in step S112 that an abnormality has occurred at the DC link or when the abnormality determination unit 16 determines in step S117 that an abnormality has occurred at the charging circuit 14, the pre-charging of the capacitor 13 is stopped in step S113. The pre-charging of the capacitor 13 is stopped by interrupting the flow of a current from the converter 11 to the capacitor 13. After the pre-charging of the capacitor 13 is stopped, the processing is terminated in a form of "abnormal termination" (step S114). In the case of abnormal termination in step S114, a display part (not illustrated) may be used to notify an operator of "occurrence of abnormality at DC link" or "occurrence of abnormality at charging circuit". Examples of the display part include a stand-alone display device, a display device attached to the motor drive device 1, a display device attached to a higher-level control device (not illustrated), and a display device attached to a personal computer and a mobile terminal. Further, for example, a light emitting device (not illustrated) such as an LED or a lamp may be used to notify the operator of "occurrence of abnormality at DC link" or "occurrence of abnormality at charging circuit". Furthermore, for example, an acoustic device (not illustrated) may be used to notify the operator of "occurrence of abnormality at DC link" or "occurrence of abnormality at charging circuit". Accordingly, the operator can easily recognize whether or not the cause of the abnormal termination of the pre-charging of the capacitor 13 is the abnormality at the DC link or the abnormality in the charging circuit 14, and can easily take measures such as replacing a component related to the abnormality or removing the cause of the abnormality.

Next, some modified examples of the motor drive device 1 according to an embodiment of the present disclosure will be described. In the modified examples described below, the charging circuit 14 is provided between the DC output side of the converter 11 and the capacitor 13, but the charging circuit 14 may be provided between the AC input side of the converter 11 and the AC power source 100.

A first modified example of the motor drive device 1 according to an embodiment of the present disclosure is applied to the motor drive device 1 of FIG. 1 or FIG. 2 wherein there is no electric machine system other than the motor drive device 1 that is connected to the AC power source 100.

Figure 4:
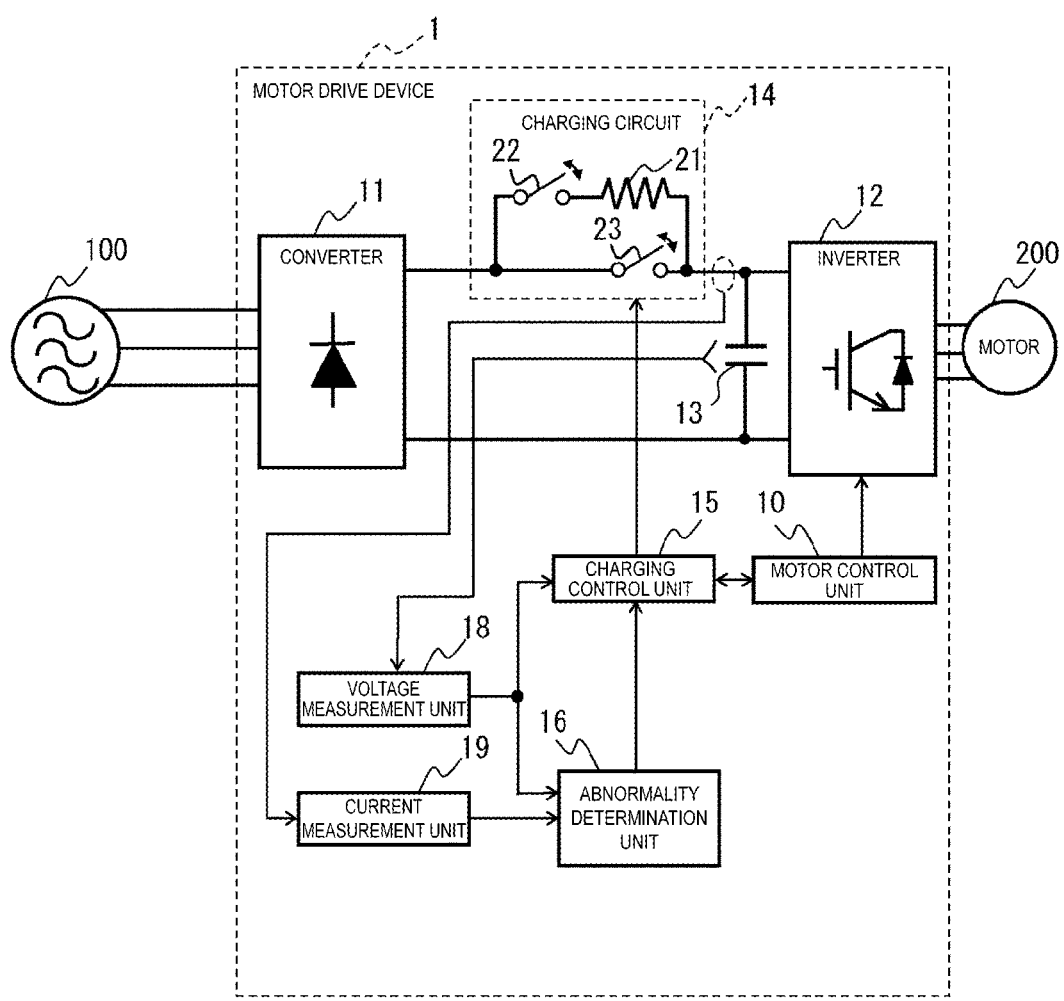
FIG. 4 is a diagram illustrating a first modified example of the motor drive device according to an embodiment of the present disclosure.

FIG. 4 is a diagram illustrating the first modified example of the motor drive device according to an embodiment of the present disclosure.

In the first modified example of the motor drive device according to an embodiment of the present disclosure, excluding the motor drive device 1, there is no electric machine system supplied with power from the AC power source 100, and thus the power consumption status acquisition unit described with reference to FIGS. 1 and 2 is not required. That is, the motor drive device 1 according to the first modified example includes the converter 11, the inverter 12, the capacitor 13, the charging circuit 14, the charging control unit 15, the abnormality determination unit 16, the voltage measurement unit 18, and the current measurement unit 19.

The abnormality determination unit 16 determines whether or not an abnormality has occurred based on a measurement value of a voltage of the capacitor 13 and a measurement value of a current flowing through the DC link during the time period of the pre-charging of the capacitor 13. The converter 11, the inverter 12, the capacitor 13, the charging circuit 14, the charging control unit 15, the voltage measurement unit 18, and the current measurement unit 19 are as described with reference to FIGS. 1 and 2.

Figure 5:
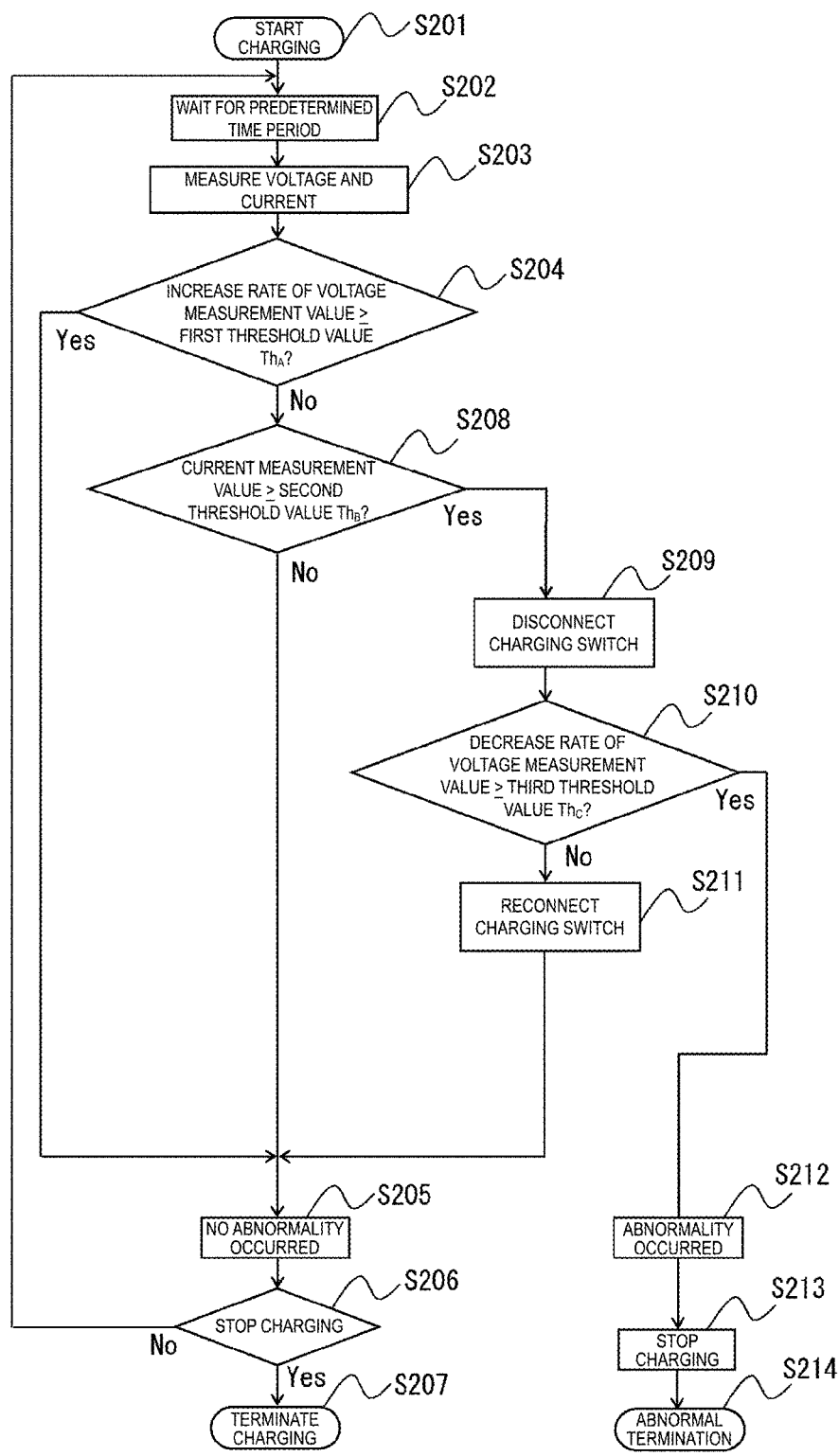
FIG. 5 is a flowchart illustrating a pre-charging operation in the first modified example of the motor drive device according to an embodiment of the present disclosure.

FIG. 5 is a flowchart illustrating a pre-charging operation in the first modified example of the motor drive device according to an embodiment of the present disclosure.

In step S201, in a state where the charging control unit 15 controls the charging switch 22 to be in the closed state and controls the main circuit switch 23 to be in the open state, the supply of power from the AC power source 100 to the motor drive device 1 is started when the AC power source 100 is applied to the motor drive device 1, and the pre-charging of the capacitor 13 is started.

After waiting for a predetermined time period in step S202, in step S203, the voltage measurement unit 18 measures a voltage of the capacitor 13 and the current measurement unit 19 measures a current flowing through the DC link. The measurement value of the voltage is sent to the abnormality determination unit 16 and the charging control unit 15, and the measurement value of the current is sent to the abnormality determination unit 16.

In step S204, the abnormality determination unit 16 determines whether or not the increase rate of the measurement value of the voltage of the capacitor 13 is equal to or more than the first threshold value $Th_A$.

When it is determined in step S204 that the increase rate of the measurement value of the voltage of the capacitor 13 is equal to or more than the first threshold value $Th_A$, the processing proceeds to step S205. When it is determined in step S204 that the increase rate of the measurement value of the voltage of the capacitor 13 is lower than the first threshold value $Th_A$, the processing proceeds to step S208.

In step S205, the abnormality determination unit 16 determines that no abnormality has occurred.

In step S206 subsequent to step S205, the charging control unit 15 determines whether or not the pre-charging of the capacitor 13 has been completed based on whether or not the measurement value of the voltage sent from the voltage measurement unit 18 has reached a predetermined charging voltage. When the measurement value of the voltage sent from the voltage measurement unit 18 has not reached the predetermined charging voltage, the charging control unit 15 determines in step S206 that the pre-charging of the capacitor 13 has not been completed, and then the processing returns to step S202. On the other hand, when the measurement value of the voltage sent from the voltage measurement unit 18 has reached the predetermined charging voltage, the charging control unit 15 determines in step S106 that the pre-charging of the capacitor 13 has been completed, and the processing proceeds to step S207.

In step S207, the charging control unit 15 controls the charging switch 22 to be in the open state and controls the main circuit switch 23 to be in the closed state, thereby terminating the pre-charging of the capacitor. After the pre-charging is completed, the motor drive device 1 drives the motor 200 by causing the converter 11 and the inverter 12 to perform normal power conversion operations.

When it is determined in step S204 that the increase rate of the measurement value of the voltage of the capacitor 13 is lower than the first threshold value $Th_A$, the abnormality determination unit 16 determines in step S208 whether or not the measurement value of the current flowing through the DC link is equal to or more than the second threshold value $Th_B$. When it is determined in step S208 that the measurement value of the current flowing through the DC link is equal to or more than the second reference value $Th_B$, the processing proceeds to step S209, and when it is determined in step S208 that the measurement value of the current flowing through the DC link is lower than the second reference value $Th_B$, the processing proceeds to step S205.

When it is determined in step S208 that the measurement value of the current flowing through the DC link is equal to or more than the second threshold value $Th_B$, in step S209, the charging control unit 15 performs a disconnection operation using the charging switch 22. That is, the charging control unit 15 performs a control of switching the charging switch 22 from the closed state to the open state, thereby disconnecting one end of the charging resistor 21 from an electric path in the charging circuit 14.

In step S210, the abnormality determination unit 16 determines whether or not the decrease rate of the measurement value of the voltage of the capacitor 13 is equal to or more than the third threshold value $Th_C$.

When it is determined in step S210 that the decrease rate of the measurement value of the voltage of the capacitor 13 is lower than the third threshold value $Th_C$, the processing proceeds to step S211. In step S211, the charging control unit 15 performs a reconnection operation using the charging switch 22. That is, the charging control unit 15 performs a control of switching the charging switch 22 from the open state to the closed state, thereby reconnecting the charging resistor 21 on the electric path in the charging circuit 14. Then, the processing proceeds to step S205.

When it is determined in step S210 that the decrease rate of the measurement value of the voltage of the capacitor 13 is equal to or more than the third threshold value $Th_C$, the processing proceeds to step S212, and the abnormality determination unit 16 determines that an abnormality has occurred at the motor drive device 1, and then the processing proceeds to step S213.

In step S213, the pre-charging of the capacitor 13 is stopped. The pre-charging of the capacitor 13 is stopped by interrupting the flow of a current from the converter 11 to the capacitor 13. After the pre-charging of the capacitor 13 is stopped, the processing is terminated in a form of "abnormal termination" (step S214). In the case of abnormal termination in step S214, a display part (not illustrated), a light emitting device (not illustrated) such as an LED or a lamp, or an acoustic device (not illustrated) may be used to notify an operator of "occurrence of abnormality". Accordingly, the operator can easily recognize the occurrence of an abnormality in the motor drive device 1, and can easily take measures such as replacing a component related to the abnormality or removing the cause of the abnormality.

As described above, in the first modified example, the abnormality determination unit 16 determines whether or not an abnormality has occurred based on a measurement value of a voltage of the capacitor 13 and a measurement value of a current flowing through the DC link during the time period of the pre-charging of the capacitor 13, but may determine whether or not an abnormality has occurred based on only one of a measurement value of a voltage of the capacitor 13 and a measurement value of a current flowing through the DC link. For example, in a configuration in which the abnormality determination unit 16 determines whether or not an abnormality has occurred based on only a measurement value of a voltage of the capacitor 13, step S208 in FIG. 5 is omitted, and when it is determined in step S204 that the increase rate of the measurement value of the voltage of the capacitor 13 is lower than the first reference value $Th_A$, the processing proceeds to step S209. Alternatively, for example, in a configuration in which the abnormality determination unit 16 determines whether or not an abnormality has occurred based on only a measurement value of a current flowing through the DC link, step S204 in FIG. 5 is omitted, and after the current measurement unit 19 measures the current flowing through the DC link in step S203, the processing of step S208 is performed.

A second modified example of the motor drive device 1 according to an embodiment of the present disclosure is configured such that, in the motor drive device 1 of FIG. 1 or FIG. 2, whether or not to continue the pre-charging is determined based on only the power consumption status of an electric machine system that shares the AC power source 100 with the motor drive device 1.

Figure 6:
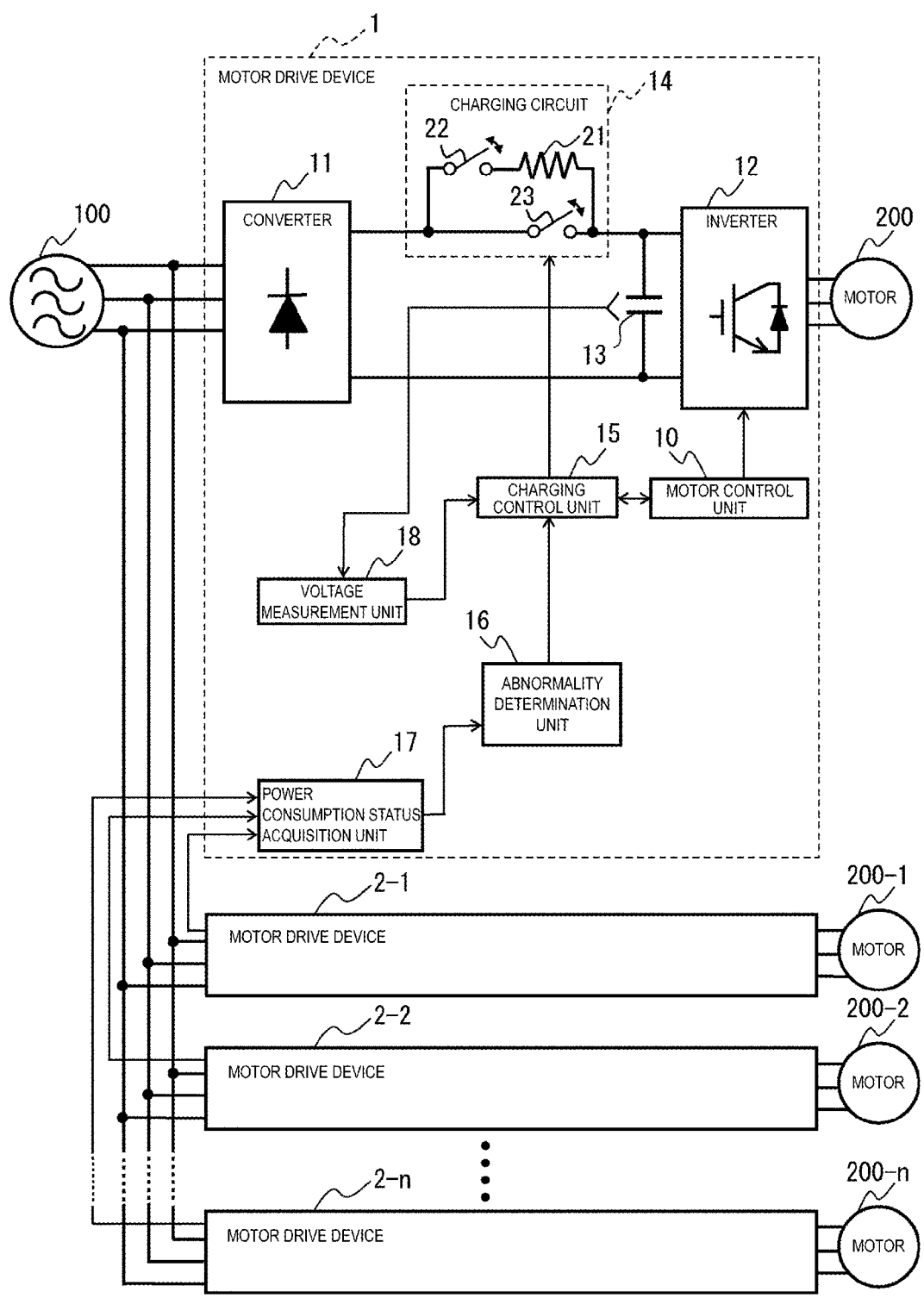
FIG. 6 is a diagram illustrating a second modified example of the motor drive device according to an embodiment of the present disclosure.

FIG. 6 is a diagram illustrating the second modified example of the motor drive device according to an embodiment of the present disclosure. In the example illustrated in FIG. 6, for example, n motor drive devices 2-1 to 2-*n* (where n is a positive integer) are connected to the AC power source 100 as electric machine systems, but the electric machine system connected to the AC power source 100 is not limited to the motor drive devices 2-1 to 2-*n* and may be any machine supplied with AC power from the AC power source 100.

In the second modified example of the motor drive device according to an embodiment of the present disclosure, since no abnormality determination process based on a measurement value of a current flowing through the DC link is performed, the current detecting unit described with reference to FIGS. 1 and 2 is not required. In the second modified example, no abnormality determination process based on a measurement value of a voltage of the capacitor 13 is also performed. However, since the measurement value of the voltage of the capacitor 13 is used to determine whether or not the capacitor 13 has reached a predetermined charging voltage, the voltage measurement unit 18 is required. For these reasons, the motor drive device 1 according to the second modified example includes the converter 11, the inverter 12, the capacitor 13, the charging circuit 14, the charging control unit 15, the abnormality determination unit 16, the power consumption status acquisition unit 17, and the voltage measurement unit 18.

The abnormality determination unit 16 determines whether or not an abnormality has occurred based on a power consumption parameter indicating the power consumption status of motor drive devices 2-1 to 2-*n* which are electric machine systems sharing the AC power source 100 with the motor drive device 1 during the time period of the pre-charging of the capacitor 13. The converter 11, the inverter 12, the capacitor 13, the charging circuit 14, the charging control unit 15, the power consumption status acquisition unit 17, and the voltage measurement unit 18 are as described with reference to FIGS. 1 and 2.

Figure 7:
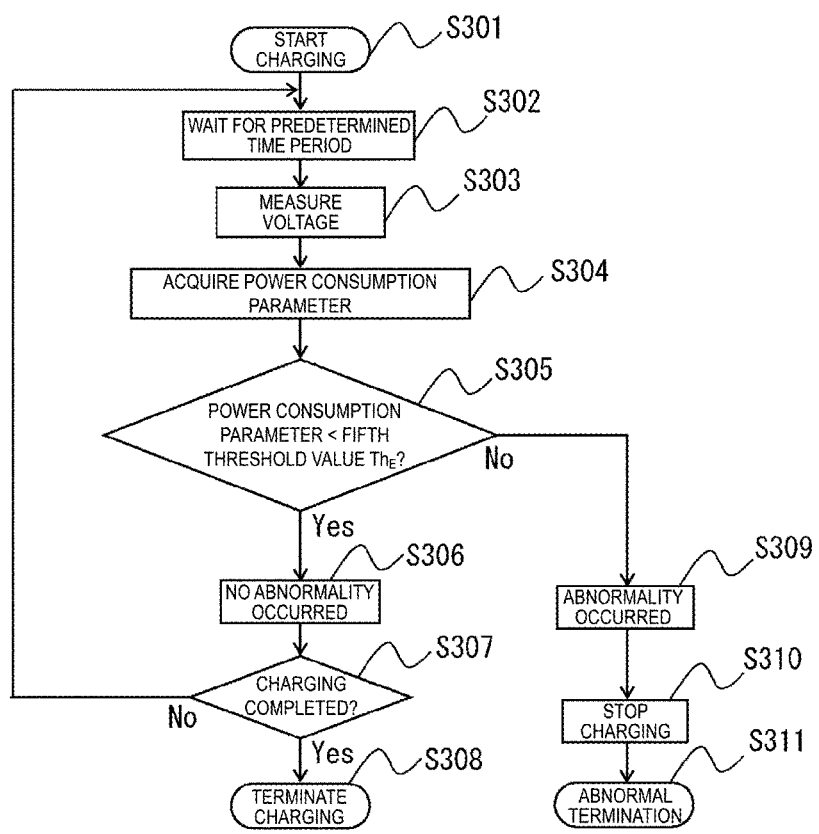
FIG. 7 is a flowchart illustrating a pre-charging operation in the second modified example of the motor drive device according to an embodiment of the present disclosure.

FIG. 7 is a flowchart illustrating a pre-charging operation in the second modified example of the motor drive device according to an embodiment of the present disclosure.

In step S301, in a state where the charging control unit 15 controls the charging switch 22 to be in the closed state and controls the main circuit switch 23 to be in the open state, the supply of power from the AC power source 100 to the motor drive device 1 is started when the AC power source 100 is applied to the motor drive device 1, and the pre-charging of the capacitor 13 is started.

After waiting for a predetermined time period in step S302, in step S303, the voltage measurement unit 18 measures a voltage of the capacitor 13. The measurement value of the voltage is sent to the abnormality determination unit 16 and the charging control unit 15.

In step S304, the power consumption status acquisition unit 17 acquires a power consumption parameter indicating the power consumption status of the motor drive devices 2-1 to 2-*n* via the communication line.

In step S305, the abnormality determination unit 16 determines whether or not the power consumption parameter is lower than the fifth threshold value $Th_E$. When it is determined in step S305 that the power consumption parameter is lower than the fifth threshold value $Th_E$, the processing proceeds to step S306, and when it is determined in step S305 that the power consumption parameter is equal to or more than the fifth threshold value $Th_E$, the processing proceeds to step S309.

In step S306, the abnormality determination unit 16 determines that no abnormality has occurred.

In step S307 subsequent to step S306, the charging control unit 15 determines whether or not the pre-charging of the capacitor 13 has been completed based on whether or not the measurement value of the voltage sent from the voltage measurement unit 18 has reached a predetermined charging voltage. When the measurement value of the voltage sent from the voltage measurement unit 18 has not reached the predetermined charging voltage, the charging control unit 15 determines in step S307 that the pre-charging of the capacitor 13 has not been completed, and then the processing returns to step S302. On the other hand, when the measurement value of the voltage sent from the voltage measurement unit 18 has reached the predetermined charging voltage, the charging control unit 15 determines in step S307 that the pre-charging of the capacitor 13 has been completed, and the processing proceeds to step S308.

In step S308, the charging control unit 15 controls the charging switch 22 to be in the open state and controls the main circuit switch 23 to be in the closed state, thereby terminating the pre-charging of the capacitor. After the pre-charging is completed, the motor drive device 1 drives the motor 200 by causing the converter 11 and the inverter 12 to perform normal power conversion operations.

When it is determined in step S305 that the power consumption parameter is equal to or more than the fifth threshold value $Th_E$, the abnormality determination unit 16 determines in step S309 that an abnormality has occurred at the motor drive device 1, and then the processing proceeds to step S310.

In step S310, the pre-charging of the capacitor 13 is stopped. The pre-charging of the capacitor 13 is stopped by interrupting the flow of a current from the converter 11 to the capacitor 13. After the pre-charging of the capacitor 13 is stopped, the processing is terminated in a form of "abnormal termination" (step S311). In the case of abnormal termination in step S311, a display part (not illustrated), a light emitting device (not illustrated) such as an LED or a lamp, or an acoustic device (not illustrated) may be used to notify an operator of "occurrence of abnormality". Accordingly, the operator can easily recognize the occurrence of an abnormality in the motor drive device 1, and can easily take measures such as replacing a component related to the abnormality or removing the cause of the abnormality.

The first modified example and the second modified example have the advantage of being simpler in configuration and lower in cost than the embodiment described with reference to FIGS. 1 and 2.

As described above, according to an embodiment of the present disclosure, and the first modified example and the second modified example of the embodiment, the pre-charging can be continued and safely completed unless there is an abnormality in the motor drive device, which is efficient, and which can reduce the number of alarms and stops related to the pre-charging.

REFERENCE SIGNS LIST

1 Motor drive device
10 Motor control unit
11 Converter
12 Inverter
13 Capacitor
14 Charging circuit
15 Charging control unit
16 Abnormality determination unit
17 Power consumption status acquisition unit
18 Voltage measurement unit
19 Current measurement unit
21 Charging resistor
22 Charging switch
23 Main circuit switch
100 AC power source
200 Motor

The invention claimed is:

1. A motor drive device comprising:
a converter configured to convert AC power supplied from an AC power source into DC power and output the DC power to a DC link;
a capacitor disposed at the DC link;
an inverter configured to convert the DC power in the DC link into AC power for driving a motor and output the AC power;
a charging circuit including a charging resistor configured to prevent an inrush current during a time period of pre-charging of the capacitor;
a charging control unit configured to control the pre-charging of the capacitor by the charging circuit; and
an abnormality determination unit configured to determine whether or not an abnormality has occurred based on at least one of a measurement value of a voltage of the capacitor or a measurement value of a current flowing through the DC link during the time period of the pre-charging of the capacitor,
wherein when an increase rate of the measurement value of the voltage of the capacitor is equal to or more than a first threshold value, the abnormality determination unit determines that no abnormality has occurred,
wherein when the increase rate of the measurement value of the voltage of the capacitor is lower than the first threshold value and the measurement value of the current flowing through the DC link is equal to or more than a second threshold value, the charging control unit is configured to perform a control of disconnecting one end of the charging resistor from an electric path, and
wherein, while the charging control unit is performing the control of disconnecting the one end of the charging resistor from the electric path, the abnormality determination unit is configured to determine that an abnormality has occurred when a decrease rate of the measurement value of the voltage of the capacitor is equal to or more than a third threshold value, and determine that no abnormality has occurred when the decrease rate of the measurement value of the voltage of the capacitor is lower than the third threshold value.

2. The motor drive device according to claim 1, further comprising:
a power consumption status acquisition unit configured to acquire a parameter related to a power consumption status of an electric machine system supplied with AC power from the AC power source,
wherein
the abnormality determination unit is configured to determine whether or not an abnormality has occurred, based on the parameter.

3. The motor drive device according to claim 2, wherein while the increase rate of the measurement value of the voltage of the capacitor is lower than the first threshold value and the measurement value of the current flowing through the DC link is lower than a fourth threshold value which is lower than the second threshold value, the abnormality determination unit is configured to determine that an abnormality has occurred when the parameter is lower than a fifth threshold value and determine that no abnormality has occurred when the parameter is equal to or more than the fifth threshold value.

4. The motor drive device according to claim 2, wherein the parameter is an amount of power consumption of the electric machine system.

5. The motor drive device according to claim 2, wherein the electric machine system is at least one additional motor drive device, and
wherein the parameter is any one of a number of motors being accelerated by the additional motor drive device, a number of capacitors disposed at a DC link in the additional motor drive device and being pre-charged, and a sum of the number of the motors being accelerated and the number of the capacitors being pre-charged.

6. The motor drive device according to claim 1, wherein the charging control unit is configured to perform a control of stopping the pre-charging of the capacitor when the abnormality determination unit determines that an abnormality has occurred.

7. A motor drive device comprising:
a converter configured to convert AC power supplied from an AC power source into DC power and output the DC power to a DC link;
a capacitor disposed at the DC link;
an inverter configured to convert the DC power in the DC link into AC power for driving a motor and output the AC power;

a charging circuit including a charging resistor configured to prevent an inrush current during a time period of pre-charging of the capacitor;
a charging control unit configured to control the pre-charging of the capacitor by the charging circuit;
a power consumption status acquisition unit configured to acquire a parameter related to a power consumption status of an electric machine system supplied with AC power from the AC power source; and
an abnormality determination unit configured to determine whether or not an abnormality has occurred based on the parameter during the time period of the pre-charging of the capacitor,
wherein the abnormality determination unit is configured to determine that an abnormality has occurred when the parameter is lower than a fifth threshold value and determine that no abnormality has occurred when the parameter is equal to or more than the fifth threshold value.

8. A motor drive device comprising:
a converter configured to convert AC power supplied from an AC power source into DC power and output the DC power to a DC link;
a capacitor disposed at the DC link;
an inverter configured to convert the DC power in the DC link into AC power for driving a motor and output the AC power;
a charging circuit including a charging resistor configured to prevent an inrush current during a time period of pre-charging of the capacitor;
a charging control unit configured to control the pre-charging of the capacitor by the charging circuit; and
an abnormality determination unit configured to determine whether or not an abnormality has occurred based on at least one of a measurement value of a voltage of the capacitor or a measurement value of a current flowing through the DC link during the time period of the pre-charging of the capacitor, wherein
the charging circuit includes:
the charging resistor,
a charging switch connected in series to the charging resistor and configured to open and close an electric path under control of the charging control unit, and
a main circuit switch connected in parallel to a set of the charging resistor and the charging switch connected in series, and configured to open and close an electric path between the converter and the capacitor or an electric path between the converter and the AC power source under control of the charging control unit,
wherein the pre-charging of the capacitor is configured to be executed when the charging switch is controlled to be in a closed state and the main circuit switch is controlled to be in an open state by the charging control unit, and
wherein, when the capacitor is charged to a predetermined charging voltage after the pre-charging of the capacitor is started, the charging switch is configured to be controlled to be in an open state and the main circuit switch is configured to be controlled to be in a closed state by the charging control unit, whereby the pre-charging of the capacitor is completed.

9. The motor drive device according to claim 8, wherein the charging control unit is configured to execute a control of disconnecting one end of the charging resistor from an electric path by controlling the charging switch to be in an open state during the time period of the pre-charging of the capacitor.

* * * * *